(12) United States Patent
Brittain et al.

(10) Patent No.: US 7,631,228 B2
(45) Date of Patent: Dec. 8, 2009

(54) USING BIT ERRORS FROM MEMORY TO ALTER MEMORY COMMAND STREAM

(75) Inventors: Mark Andrew Brittain, Pflugerville, TX (US); Warren Edward Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/531,051

(22) Filed: Sep. 12, 2006

(65) Prior Publication Data

US 2008/0072116 A1  Mar. 20, 2008

(51) Int. Cl.
*G06F 11/00* (2006.01)
*H03M 13/00* (2006.01)
*G11C 7/00* (2006.01)

(52) U.S. Cl. .................. 714/704; 714/754; 365/222
(58) Field of Classification Search ........... 714/754, 714/704; 365/222
See application file for complete search history.

(56) References Cited

U.S. PATENT DOCUMENTS

| 4,056,831 | A | 11/1977 | Godbout et al. ......... 360/77.02 |
|---|---|---|---|
| 6,483,764 | B2 | 11/2002 | Chen Hsu et al. ........... 365/222 |
| 6,647,320 | B1 | 11/2003 | Inoue ...................... 700/300 |
| 6,684,292 | B2 | 1/2004 | Piccirillo et al. ........... 711/106 |
| 6,687,642 | B2 | 2/2004 | Maher et al. ............... 702/127 |
| 6,742,144 | B2 | 5/2004 | Co ........................... 714/42 |
| 6,936,775 | B2 | 8/2005 | Jiang et al. ................. 174/261 |
| 6,981,173 | B2 | 12/2005 | Ferguson et al. ............ 714/5 |
| 7,028,213 | B2 | 4/2006 | Majni et al. ................. 714/5 |
| 7,184,352 | B2 * | 2/2007 | Klein et al. ................. 365/222 |
| 7,447,950 | B2 * | 11/2008 | Takahashi et al. ........... 714/702 |
| 7,493,531 | B2 * | 2/2009 | Ito et al. ..................... 714/708 |
| 2006/0179333 | A1 | 8/2006 | Brittain et al. .............. 713/320 |

FOREIGN PATENT DOCUMENTS

JP   04104311 A   4/1992

OTHER PUBLICATIONS

Applied Micro Circuits Corporation, ECC Overview for the PowerPC 440GP/GX, Sep. 7, 2004, Revision 1.01, pp. 1-3.*
"A BIST methodology for comprehensive testing of RAM with reduced heat dissipation", Proceedings. International Test Conference 1996. Test and Design Validity. (IEEE) p. 386-395.

* cited by examiner

*Primary Examiner*—John J Tabone, Jr.
(74) *Attorney, Agent, or Firm*—VanLeeuwen & VanLeeuwen; Libby Z. Handelsman

(57) ABSTRACT

A system, method, and memory controller are provided that alters a memory command stream to a hardware memory. Data is written to the hardware memory and, after the data is stored in the memory, error correction code is received from the memory. Bit errors are identified based upon the error correction code that was received. The memory command stream is then altered based upon the number of bit errors that were identified. In one embodiment, altering the memory command stream includes adjusting a memory refresh rate, while in another embodiment, altering the memory command stream includes adjusting a memory usage delay.

14 Claims, 5 Drawing Sheets

USING BIT ERRORS FROM MEMORY TO ALTER MEMORY COMMAND STREAM

BACKGROUND OF THE INVENTION

1. Technical Field

The present invention relates to a system and method for adjusting command streams to memory in response to bit errors in the memory. More particularly, the present invention relates to a system and method adjusting refresh rates and usage delays in response to bit errors exceeding a given threshold.

2. Description of the Related Art

Memory errors in computer systems can result from a variety of factors, such as heat and other environmental conditions. Poor ventilation of a computer system, caused from the system's physical location or from dust blocking air ducts, can cause increased heat in a computer system and may result in memory errors. In addition, power supplies can also cause power fluctuations that can lead to memory errors.

Memory is an electronic storage device, and like most electronic storage devices, it has the potential to incorrectly return information different than what was originally stored in the memory. Dynamic Random Access Memory (DRAM), because of its nature, is likely to return occasional memory errors. DRAM stores ones and zeros as charges on small capacitors that are continually refreshed to ensure that the data is not lost. Generally, DRAM is less reliable than the static storage used by Static Random Access Memory (SRAMs). While SRAMs are generally more reliable and faster than DRAMs, SRAMs are generally more expensive and are therefore often used for cache memory with main memory often using DRAMs. A "Rank" defines a set of DRAM chips (on a module) generally comprising 8 byte wide (64 bits) data, or 9 bytes (72 bits) with ECC. Devices in a Rank are connected by a single Chip-Select. The actual memory size in a Rank is not defined. Single-sided memory modules are generally Single-Rank, while double-sided unbuffered DIMMs and SODIMMs are generally Dual-Rank. Server DIMMs may have up to 4 ranks.

One kind of memory error that occurs in computer systems is called a transient or soft error. This occurs when a bit reads back the wrong value once, but subsequently functions correctly. Soft errors are sometimes caused by memory that is physically bad, but at least as often they are the result of poor quality motherboards, memory system timings that are set too fast, static shocks, or environmental factors such as heat and power fluctuations.

Errors in the memory subsystem are a concern at the system level as they can result in a system crash or incorrect data that can affect the outcome of the applications running on the system. Parity checking provides single-bit error detection for the system memory, but generally does not handle multi-bit errors, and does not provide a way to correct memory errors. An advanced error detection and correction protocol was invented to go a step beyond simple parity checking. Called ECC, which stands for error correcting circuits, error correcting code, or error correction code, this protocol not only detects both single-bit and multi-bit errors, it will actually transparently correct errors on the fly.

ECC uses an algorithm to encode information in a block of bits that contains sufficient detail to permit the recovery of a memory error in the protected data. Depending on the complexity of the ECC algorithm a single bit error, multiple single bit errors, or a packet error (a block of consecutive bits) can be corrected. Unlike parity, which uses a single bit to provide protection to eight bits, ECC uses larger groupings: for example 7 bits to protect 32 bits, or 8 bits to protect 64 bits. Industry standard memory modules come in two form factors: a non-ECC module with 64 bits of data and a ECC module with 64 bits of data and 8 bits for the ECC code. These ECC modules can be used for memory subsystems that implement either a parity protection scheme or a ECC scheme. For systems that require a higher level of reliability, custom memory modules with additional ECC bits can be defined to allow for more correction and detection capability.

ECC has the ability to correct a detected error in a block of memory. When this happens, the computer will continue without incident and the user will not be aware that a memory error occurred. Although the addition of ECC to a memory subsystem has improved the memory reliability, ECC has a limited correction capability. Error Correction Codes can be designed to correct as little as a single bit error in a block of memory to correcting large numbers of random bit errors in a block of memory. At the system level the trade off is correction capability versus the cost of implementing the code in logic complexity and overhead of DRAM bits. In general, the ECC for a system is designed to correct a subset of the possible memory errors. This subset is based on analysis of failure mechanisms in the system when the system is running at nominal conditions. For example, analysis of a system design may indicate that, under nominal conditions, a very high percentage of memory errors that occur would be single bit failures. For this example system, the ECC may be designed to correct single bit errors and detect any two single bit errors. If an error occurred that was larger than the correction capability of the error correction code, then that data from memory would be unusable and the application being executed would fail.

The memory subsystem design point generally assumes that a single error event might occur in a block of memory. This one error event is correctable by way of the ECC logic. This assumption holds true as long as the block of memory is read and corrected before a second error event occurs. Under normal conditions, this is generally not a problem as error events usually occur far apart in terms of time. One challenge faced by the memory subsystem is that under extreme conditions the actual rate that a fail event can occur may increase to the point that multiple fail events would occur between access to the block of memory. This would result in a block of memory with unusable data and a potential for an application or system crash. This condition of increased fail rates can be the result of environmental factors (such as excessive heat), system level noise due to high activity levels, power line disturbances and many other factors. These conditions are difficult and expensive to detect with normal means and, unless detected in time, result in a non-recoverable system error. Moreover, once detected, there is currently no way to dynamically alter the correction capability of the memory subsystem to avoid the failure.

SUMMARY

It has been discovered that the aforementioned conditions that can result in increased memory fail rates are resolved using a system, method and memory controller that alters a memory command stream to a hardware memory. Logic is added to the system memory controller that monitors the fail rates of the system memory. The fail rate is monitored by counting correctable failures detected by the ECC logic in the memory controller. If the memory fail rate exceeds a programmable fail rate then the memory controller will attempt to reduce the fail rate by changing the command stream that is sent to the memory DIMMs. By changing the command stream to the memory, the conditions that are resulting in an increased fail rate will be reduced, thereby lowering the error rate back to an acceptable level. These conditions affected by the command stream include thermal conditions, power supply disturbances, and system level noise conditions. In one embodiment, altering the memory command stream includes adjusting a memory refresh rate, in another an increase in the memory scrub rate that proactively corrects errors, while in another embodiment, altering the memory command stream includes adjusting a memory usage delay.

In one embodiment, the number of correctable errors that occur during a certain period of time are counted and this count is compared to one or more thresholds. The altering of the memory command stream is then performed based on the comparison of the error count to the thresholds. The altering of the memory command stream may include reducing activity to the memory devices, increasing the memory scrub rates to proactively correct errors, and changing the activity rate to eliminate operation patterns that may be creating noise patterns in the system.

In one embodiment, the number of correctable errors that occur during a period of time are counted for a number of memory ranks that are included in the hardware memory. Each of the memory ranks can have a different error count. An overall error count for the hardware memory is computed by summing the errors found for the various memory ranks and an overall refresh rate is found by comparing the overall error count to a first set of thresholds. In addition, refresh rates for the individual memory ranks can be adjusted by comparing the error count associated with each of the memory ranks with a second set of thresholds that is used for individual memory ranks. In an alternative embodiment, a memory usage delay associated with the overall memory and with each of the individual memory ranks is adjusted.

In another embodiment, the number of correctable errors that occur during a period of time are counted for a number of memory ranks that are included in the hardware memory, with each of the memory ranks able to have a different error count. In this embodiment, both a refresh rate and a memory usage rate associated with the individual memory ranks can be adjusted by comparing the error counts to one or more thresholds.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
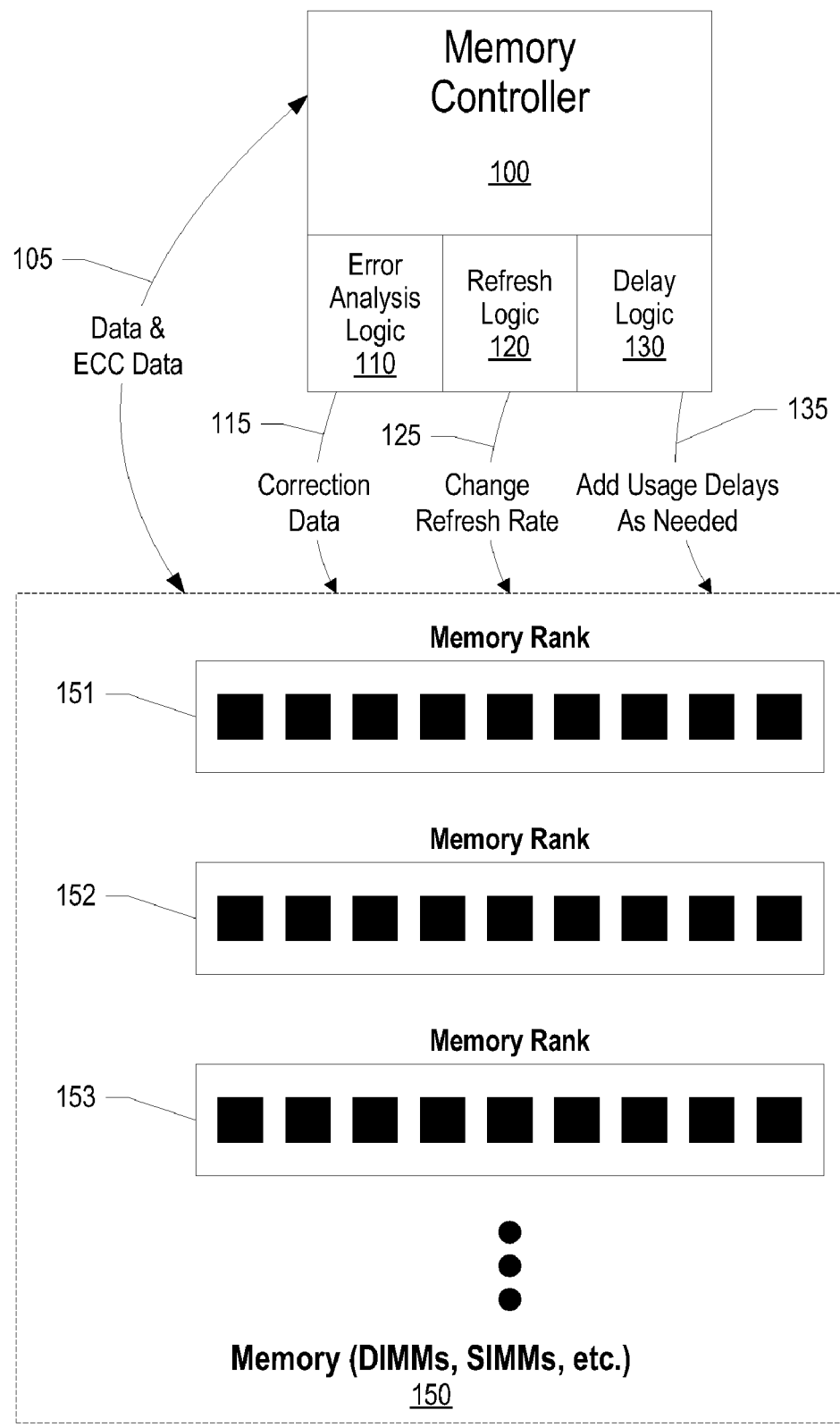
FIG. 1 is a component-level diagram showing a memory controller interacting with memory.

FIG. 1 is a component-level diagram showing a memory controller interacting with memory. Memory controller 100 reads and writes data to memory 150. In one embodiment, memory 150 includes one or more memory ranks (memory ranks 151, 152, 153 . . . ). After data and error correction code (105) is written to memory 150, memory controller reads the error correction code and determines whether bit errors are present in the stored data by executing error analysis logic 110. One example of error correction code is a simple checksum with error analysis logic 110 comparing the checksum of data stored a memory location with the checksum that was stored with the data. Small bit errors identified by error analysis logic 110 can be corrected by writing correction data (115) to the memory. Error analysis logic 110 keeps track of the bit errors that occur in memory. In addition error analysis logic 110 tracks the particular memory ranks (151, 152, 153 . . . ) where the bit errors occur.

Some types of memory are periodically refreshed. Memory that is refreshed is typically capacitor-based memory where the individual capacitors are periodically refreshed. When refreshable memory is being used, memory controller executes refresh logic 120 to adjust the refresh rate (125) based on the number of bit errors encountered. When increased numbers of bit errors are identified, refresh logic 120 increases the refresh rate. Increasing the refresh rate likely results in fewer bit errors being encountered. As bit errors decrease, refresh logic 120 decreases the refresh rate. Refresh rates can be established for both the overall memory as well as individual memory ranks. In this manner, a higher refresh rate can be set for a memory rank that is experiencing more bit errors than other memory ranks. Likewise, if conditions, such as heat, cause increased bit errors from all of the memory ranks, the overall refresh rate for the memory can be set accordingly.

Memory controller 100 can also set memory usage delays. Again, like refresh delays, memory usage delays can be set for both the overall memory as well as individual memory ranks. When bit errors are encountered, memory controller 100 executes delay logic 130 to adjust the usage delay (135) based on the number of bit errors encountered. When increased numbers of bit errors are identified, delay logic 130 increases the usage delay. Increasing the usage delay likely results in fewer bit errors being encountered. As bit errors decrease, delay logic 130 decreases the usage delay. Usage delays can be established for both the overall memory as well as individual memory ranks. In this manner, a higher usage delay can be set for a memory rank that is experiencing more bit errors than other memory ranks. Likewise, if conditions, such as heat, cause increased bit errors from all of the memory ranks, the overall usage delay for the memory can be set accordingly.

When a refreshable memory is being used, adjustments to both the refresh rate and usage delays can be made to either the overall memory as well as to individual memory ranks. In this manner, both types of adjustments work in conjunction to decrease bit errors while not overly increasing one of the delays. Further, it might be found through adjustments to the refresh rates and usage delays that an adjustment to the refresh rate or usage delay is more beneficial in a particular type of environment.

Figure 2:
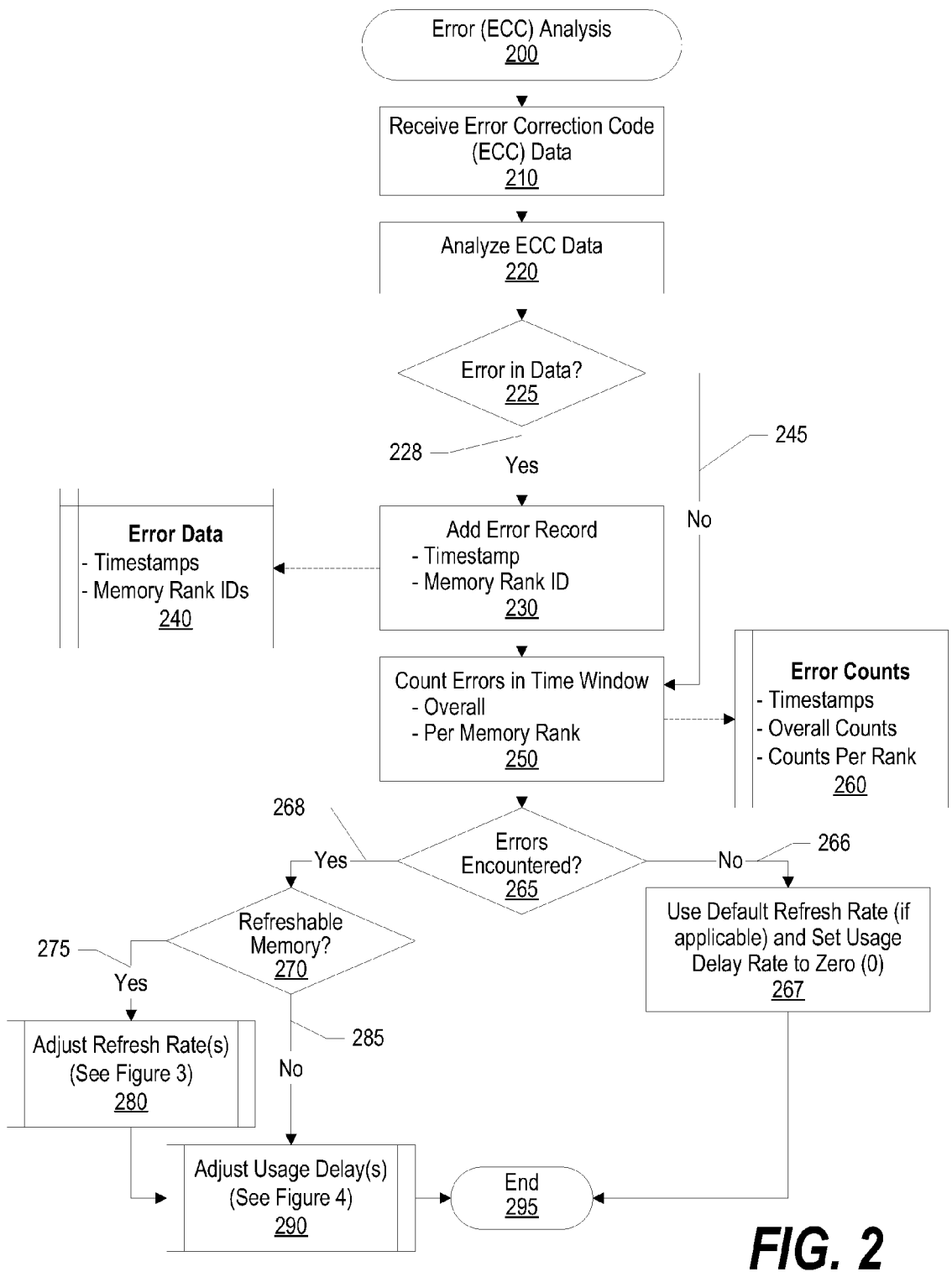
FIG. 2 is a flowchart showing the steps taken during error analysis of data written to the memory.

FIG. 2 is a flowchart showing the steps taken during error analysis of data written to the memory. Processing commences at 200 whereupon, at step 210, the memory controller receives error correction code (ECC) data from the memory. At step 220, the received error correction code is analyzed and, based on the analysis, a determination is made as to whether there are bit errors in the data that was written to memory (decision 225). If the analysis reveals bit errors, decision 225 branches to "yes" branch 228 whereupon, at step 230, an error record is added to error data store 240. In one embodiment, error data store 240 is stored in a memory accessible to the memory controller. The error records stored in error data store 240 include the timestamps of when the bit errors were encountered. If multiple memory ranks are being managed by the memory controller, the identifier of the memory rank where the error occurred is also written to the error data store. Returning to decision 225, if a bit error was not revealed by analyzing the error correction code data, then decision 225 branches to "no" branch 245 bypassing step 230.

At step 250 the number of errors occurring in a particular time window are counted for the overall memory as well as the individual memory ranks (if individual memory ranks are being managed by the memory controller). A time window is a certain period of time (e.g., one second). In one embodiment, step 250 is performed periodically rather than every time data is written to memory. The counts computed in step 250 are stored in error counts data store 260. Error counts data store 260 is also stored in a memory accessible to the memory controller. The counts stored in error counts data store 260 include the timestamps of when the count was performed along with the overall count for bit errors occurring in the memory. If multiple memory ranks are being managed by the memory controller, the error counts for each memory rank are also stored in the error count data store along with the timestamp of when the respective counts were taken.

A determination is made as to whether bit errors were encountered within the time window (decision 265). If no bit errors were encountered, then decision 265 branches to "no" branch 266 whereupon, at step 267, the default refresh rate (if applicable to the type of memory being used) is used and the additive usage delay is set to zero (0). The memory controller's error analysis processing thereafter ends at 295.

Returning to decision 265, if bit errors were encountered during the time window, then decision 265 branches to "yes" branch 268 whereupon another determination is made as to whether refreshable memory is being used (decision 270). If refreshable memory is being used, then decision 270 branches to "yes" branch 275 whereupon the refresh rate(s) of the memory (and individual memory ranks, if applicable) are adjusted (predefined process 280, see FIG. 3 and corresponding text for processing details). On the other hand, if refreshable memory is not being used, then decision 270 branches to "no" branch 285 bypassing predefined process 280. At predefined process 290, the usage delays are adjusted (see FIG. 4 and corresponding text for processing details). The memory controller's error analysis processing thereafter ends at 295.

Figure 3:
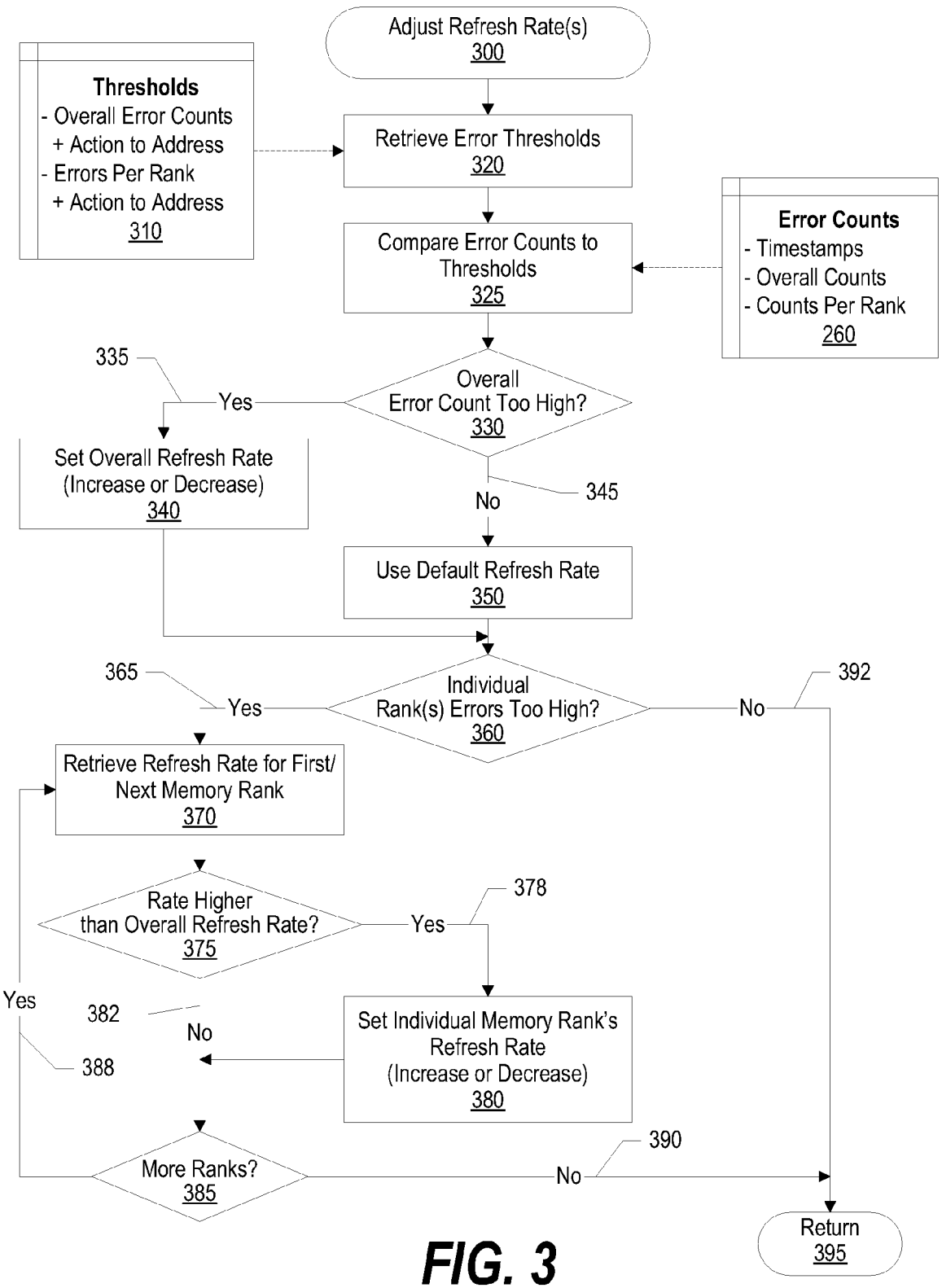
FIG. 3 is a flowchart showing the steps taken to adjust refresh rates in response to errors occurring when writing data to the memory.
Figure 4:
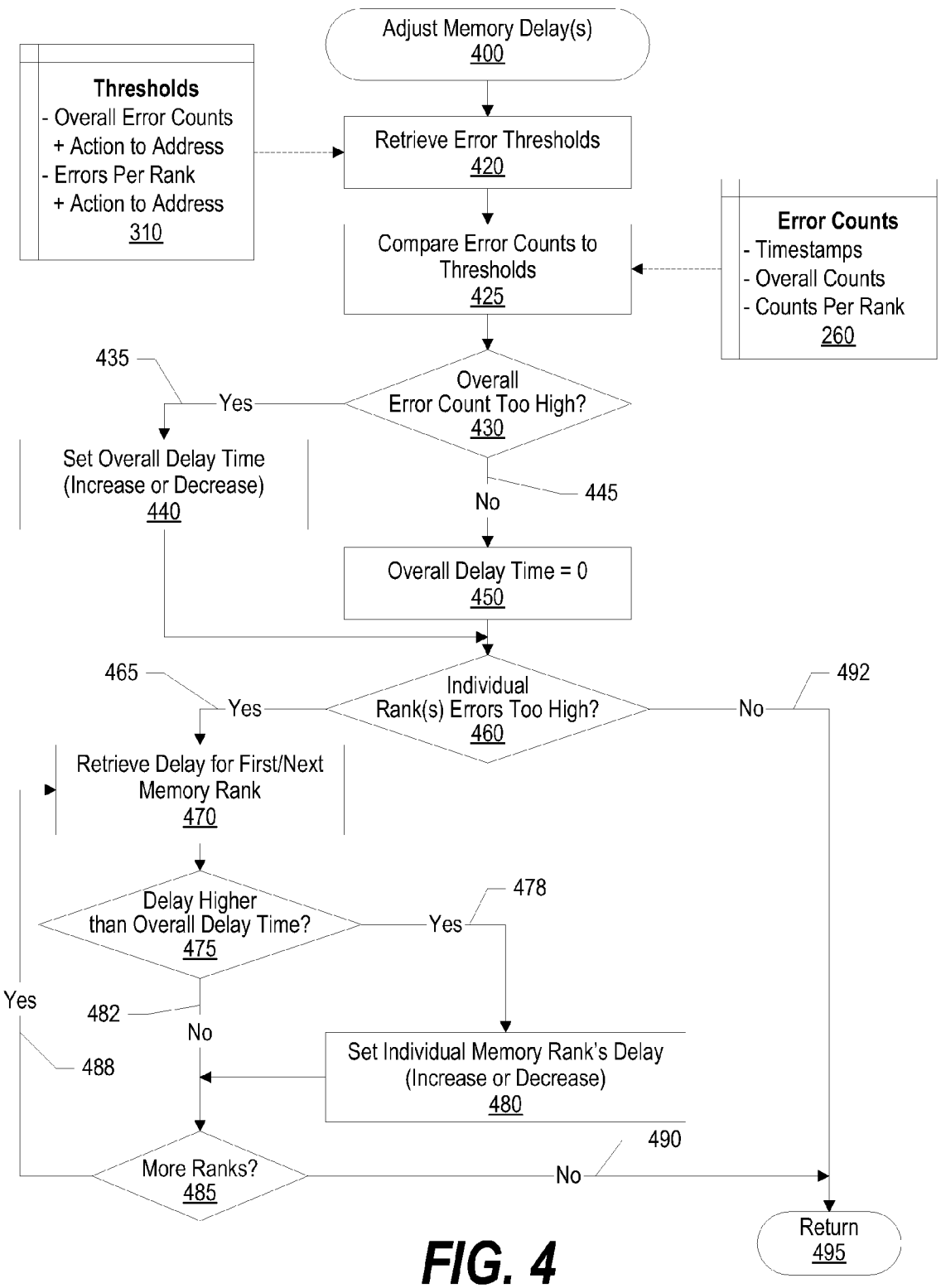
FIG. 4 is a flowchart showing the steps taken to adjust usage delays in response to errors occurring when writing data to the memory.

FIG. 3 is a flowchart showing the steps taken to adjust refresh rates in response to errors occurring when writing data to the memory. Processing commences at 300 whereupon, at step 320, error thresholds are retrieved from thresholds data store 310. As shown, thresholds 310 can include both overall bit error thresholds as well as thresholds for individual memory ranks if the memory controller is managing multiple ranks of memory. Thresholds 310 can include actions used to address the bit error rate that is being encountered. The actions can include adjustments to the refresh rates as well as adjustments to the usage delays (computation of which is shown in FIG. 4). At step 325, the error counts stored in error counts data store 260 are compared to the thresholds. At decision 330, a determination is made as to whether the overall number of bit errors exceed a minimum threshold set for the memory. If the overall number of errors exceed the minimum threshold, decision 330 branches to "yes" branch 335 whereupon, at step 340, the overall refresh rate is set based upon the retrieved thresholds. Note that the refresh rate that is set may be an increased refresh rate, a decreased refresh rate, or the same refresh rate when compared to the refresh rate that was previous set for the memory. Returning to decision 330, if the overall number of bit errors does not exceed a minimum threshold, then decision 330 branches to "no" branch 345 whereupon, at step 350, the default refresh rate is applied to the overall memory.

A determination is made as to whether any individual memory ranks (if individual memory ranks are being managed by the memory controller) have bit error counts that exceed a minimum threshold (decision 360). If any individual memory ranks have bit error counts that exceed a minimum threshold, then decision 360 branches to "yes" branch 365 whereupon, at step 370, the refresh rate for the first memory rank with a bit error count exceeding the minimum threshold is retrieved from thresholds 310. A determination is made as to whether the retrieved refresh rate is higher than the overall refresh rate set in either step 340 or 350 (decision 375). If the refresh rate retrieved for the individual memory rank is higher than the overall refresh rate that has been set, decision 375 branches to "yes" branch 378 and the individual memory rank's refresh rate is set to the retrieved refresh rate. Note again that the refresh rate that is set for the individual memory rank may be an increased refresh rate, a decreased refresh rate, or the same refresh rate when compared to the refresh rate that was previous set for the memory rank. Returning to decision 375, if the refresh rate retrieved for the individual memory rank is not higher than the overall refresh rate that has been set, then decision 375 branches to "no" branch 382 bypassing step 380.

A determination is made as to whether there are more memory ranks with bit error counts that exceed the minimum threshold (decision 385). If there are more memory ranks with bit error counts exceeding the minimum threshold, decision 385 branches to "yes" branch 388 which loops back to retrieve the refresh rate for the next memory rank with a bit error count that exceeds the minimum threshold and process the memory rank's refresh rate. This looping continues until all memory ranks with bit error counts exceeding the minimum threshold have been processed, at which point decision 385 branches to "no" branch 390 and processing used to adjust the refresh rates returns to the calling routine (e.g., see FIG. 2) at 395.

Returning to decision 360, if there are no individual memory ranks with bit error counts exceeding the minimum threshold, then decision 360 branches to "no" branch 392 bypassing steps 370 through 385. Processing used to adjust the refresh rates then returns to the calling routine (e.g., see FIG. 2) at 395.

FIG. 4 is a flowchart showing the steps taken to adjust usage delays in response to errors occurring when writing data to the memory. Processing commences at 400 whereupon, at step 420, error thresholds are retrieved from thresholds data store 310. As shown, thresholds 310 can include both overall bit error thresholds as well as thresholds for individual memory ranks if the memory controller is managing multiple ranks of memory. Thresholds 310 can include actions used to address the bit error rate that is being encountered. The actions can include adjustments to the refresh rates (computation of which is shown in FIG. 3) as well as adjustments to the usage delays. At step 425, the error counts stored in error counts data store 260 are compared to the thresholds. At decision 430, a determination is made as to whether the overall number of bit errors exceed a minimum threshold set for the memory. If the overall number of errors exceed the minimum threshold, decision 430 branches to "yes" branch 435 whereupon, at step 440, the overall usage delay is set based upon the retrieved thresholds. Note that the usage delay that is set may be an increased usage delay, a decreased usage delay, or the same usage delay as compared to the usage delay that was previous set for the memory. Returning to decision 430, if the overall number of bit errors does not exceed a minimum threshold, then decision 430 branches to "no" branch 445 whereupon, at step 450, the overall usage delay is set to zero (0) signifying no overall usage delay.

A determination is made as to whether any individual memory ranks (if individual memory ranks are being managed by the memory controller) have bit error counts that exceed a minimum threshold (decision 460). If any individual memory ranks have bit error counts that exceed a minimum threshold, then decision 460 branches to "yes" branch 465 whereupon, at step 470, the usage delay for the first memory rank with a bit error count exceeding the minimum threshold is retrieved from thresholds 310. A determination is made as to whether the retrieved usage delay is higher than the overall usage delay set in step 440 (decision 475). If the usage delay retrieved for the individual memory rank is higher than the overall usage delay that has been set, decision 475 branches to "yes" branch 478 and the individual memory rank's usage delay is set to the retrieved usage delay. Note again that the usage delay that is set for the individual memory rank may be an increased usage delay a decreased usage delay, or the same usage delay as compared to the usage delay that was previous set for the memory rank. Returning to decision 475, if the usage delay retrieved for the individual memory rank is not higher than the overall usage delay that has been set, then decision 475 branches to "no" branch 482 bypassing step 480.

A determination is made as to whether there are more memory ranks with bit error counts that exceed the minimum threshold (decision 485). If there are more memory ranks with bit error counts exceeding the minimum threshold, decision 485 branches to "yes" branch 488 which loops back to retrieve the usage delay for the next memory rank with a bit error count that exceeds the minimum threshold and process the memory rank's usage delay. This looping continues until all memory ranks with bit error counts exceeding the minimum threshold have been processed, at which point decision 485 branches to "no" branch 490 and processing used to adjust the usage delay returns to the calling routine (e.g., see FIG. 2) at 495.

Returning to decision 460, if there are no individual memory ranks with bit error counts exceeding the minimum threshold, then decision 460 branches to "no" branch 492 bypassing steps 470 through 485. Processing used to adjust the usage delay then returns to the calling routine (e.g., see FIG. 2) at 495.

Figure 5:
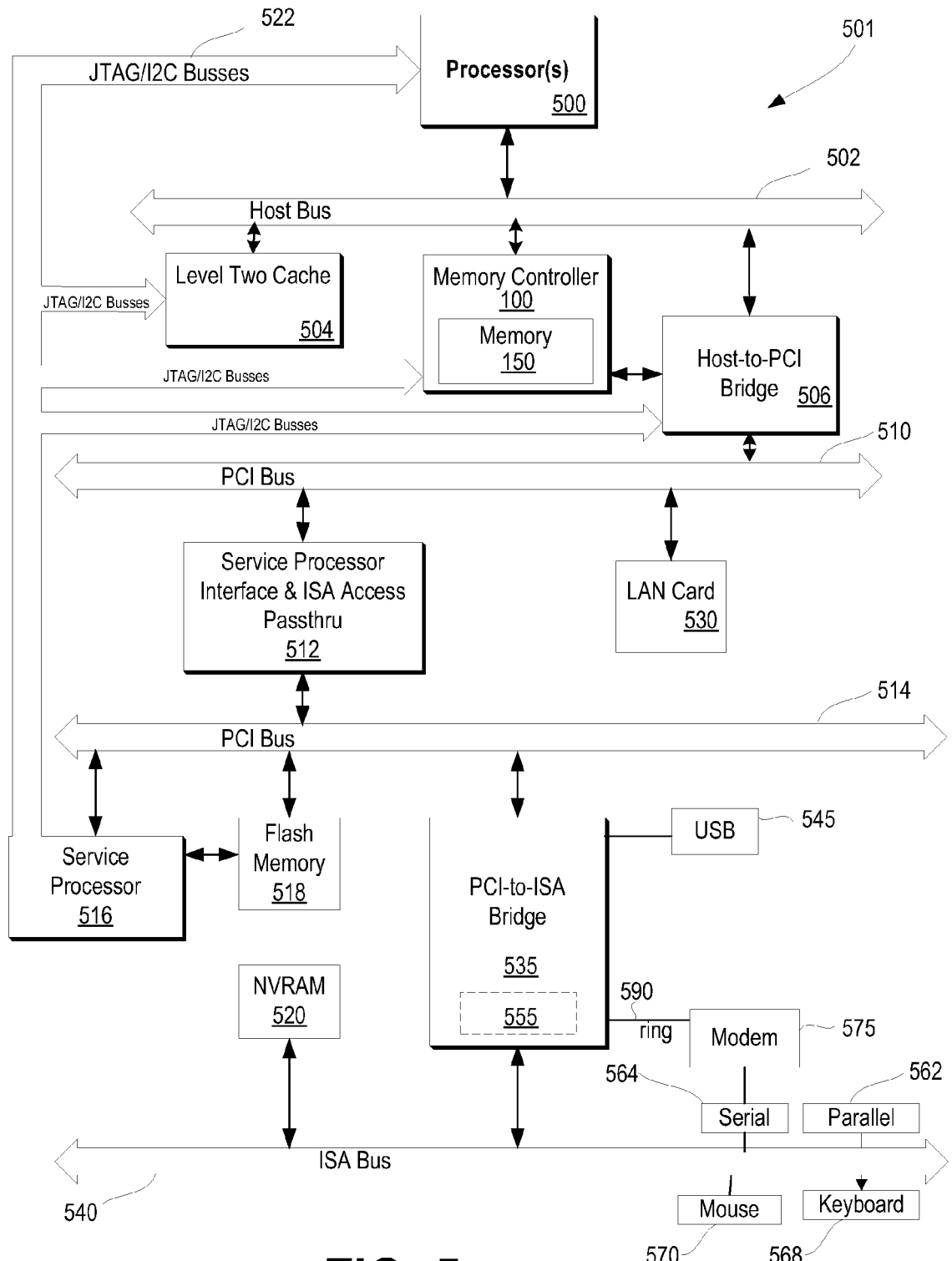
FIG. 5 is a block diagram of a computing device capable of implementing the present invention.

FIG. 5 illustrates information handling system 501 which is a simplified example of a computer system capable of performing the computing operations described herein. Computer system 501 includes processor 500 which is coupled to host bus 502. A level two (L2) cache memory 504 is also coupled to host bus 502. Host-to-PCI bridge 506 is coupled to memory controller 100, includes cache memory and main memory control functions, and provides bus control to handle transfers among PCI bus 510, processor 500, L2 cache 504, memory 150, and host bus 502. Memory controller 100 is coupled to Host-to-PCI bridge 506 as well as host bus 502. Access to memory 150 is controlled by memory controller 100. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C busses 522 for communication with processor(s) 500 during initialization steps. JTAG/I2C busses 522 are also coupled to L2 cache 504, Host-to-PCI bridge 506, and memory controller 100 providing a communications path between the processor, the Service Processor, the L2 cache, the Host-to-PCI bridge, and the memory controller. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While FIG. 5 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for altering a memory command stream to a hardware memory, the method comprising:
   writing data to the hardware memory;
   receiving error correction code data from the hardware memory in response to writing the data to the hardware memory;
   in response to receiving the error correction code data, counting a number of bit errors that occur during a period of time for each of a plurality of memory ranks included in the hardware memory, the counting resulting in a plurality of error counts;
   computing an overall error count for the hardware memory based on a sum of the plurality of error counts;
   comparing the overall error count to one or more overall thresholds, the comparing resulting in an overall comparison;
   adjusting an overall memory usage delay for the hardware memory based on the overall comparison;
   comparing each of the plurality of error counts to one or more memory rank error thresholds, the comparing resulting in a plurality of memory rank comparisons; and
   adjusting one or more memory rank usage delays, wherein each of the memory rank usage delays corresponds to one of the plurality of memory ranks, and wherein each of the adjusted memory rank usage delays is based on one of the memory rank comparisons.

2. The method of claim 1 further comprising:
   adjusting an overall refresh rate for the hardware memory based on the overall comparison; and
   adjusting one or more memory rank refresh rates, wherein each of the memory rank refresh rates corresponds to one of the plurality of memory ranks, and wherein each of the adjusted memory rank refresh rates is based on one of the memory rank comparisons.

3. The method of claim 1 further comprising:
   adjusting one or more memory rank refresh rates, wherein each of the memory rank refresh rates corresponds to one of the plurality of memory ranks, and wherein each of the adjusted memory rank refresh rates is based on one of the memory rank comparisons.

4. The method of claim 1 wherein adjusting the overall memory usage delay comprises increasing the overall memory usage delay in response to the overall error count being greater than one or more of the overall thresholds.

5. The method of claim 1 wherein adjusting one or more memory rank usage delays comprises increasing a first memory rank usage delay in response to a first memory rank error count being greater than a first memory rank error threshold.

6. An information handling system comprising:
   one or more processors;
   a memory accessible by at least one of the processors, access to the memory controlled by a memory controller;
   a set of instructions stored in a nonvolatile memory accessible by the memory controller, wherein the memory controller executes the set of instructions in order to perform actions of:
   writing data to the memory;
   receiving error correction code data from the memory in response to writing the data to the memory;
   in response to receiving the error correction code data, counting a number of bit errors that occur during a period of time for each of a plurality of memory ranks included in the hardware memory, the counting resulting in a plurality of error counts;
   computing an overall error count for the hardware memory based on a sum of the plurality of error counts;
   comparing the overall error count to one or more overall thresholds, the comparing resulting in an overall comparison;
   adjusting an overall memory usage delay for the hardware memory based on the overall comparison;
   comparing each of the plurality of error counts to one or more memory rank error thresholds, the comparing resulting in a plurality of memory rank comparisons; and
   adjusting one or more memory rank usage delays, wherein each of the memory rank usage delays corresponds to one of the plurality of memory ranks, and wherein each of the adjusted memory rank usage delays is based on one of the memory rank comparisons.

7. The information handling system of claim 6, wherein the system further comprises additional instructions that, when executed by the memory controller, perform steps of:
   adjusting an overall refresh rate for the memory based on the overall comparison; and
   adjusting one or more memory rank refresh rates, wherein each of the memory rank refresh rates corresponds to one of the plurality of memory ranks, and wherein each of the adjusted memory rank refresh rates is based on one of the memory rank comparisons.

8. The information handling system of claim 6 wherein adjusting the overall memory usage delay comprises increasing the overall memory usage delay in response to the overall error count being greater than one or more of the overall thresholds.

9. The information handling system of claim 6 wherein adjusting one or more memory rank usage delays comprises increasing a first memory rank usage delay in response to a first memory rank error count being greater than a first memory rank error threshold.

10. A memory controller that controls access to a memory, the memory controller having access to a computer-readable storage medium where functional descriptive material is stored that, when executed by the memory controller, causes the memory controller to perform actions that include:
    writing data to the memory;
    receiving error correction code data from the memory in response to writing the data to the memory;
    in response to receiving the error correction code data, counting a number of bit errors that occur during a period of time for each of a plurality of memory ranks included in the hardware memory, the counting resulting in a plurality of error counts;
    computing an overall error count for the hardware memory based on a sum of the plurality of error counts;

comparing the overall error count to one or more overall thresholds, the comparing resulting in an overall comparison;

adjusting an overall memory usage delay for the hardware memory based on the overall comparison;

comparing each of the plurality of error counts to one or more memory rank error thresholds, the comparing resulting in a plurality of memory rank comparisons; and adjusting one or more memory rank usage delays, wherein each of the memory rank usage delays corresponds to one of the plurality of memory ranks, and wherein each of the adjusted memory rank usage delays is based on one of the memory rank comparisons.

11. The memory controller of claim 10 further comprising additional functional descriptive material that, when executed by the memory controller, cause the memory controller to perform actions of:

adjusting an overall refresh rate for the memory based on the overall comparison; and adjusting one or more memory rank refresh rates, wherein each of the memory rank refresh rates corresponds to one of the plurality of memory ranks, and wherein each of the adjusted memory rank refresh rates is based on one of the memory rank comparisons.

12. The memory controller of claim 10 further comprising additional functional descriptive material that, when executed by the memory controller, cause the memory controller to perform actions of:

adjusting one or more memory rank refresh rates, wherein each of the memory rank refresh rates corresponds to one of the plurality of memory ranks, and wherein each of the adjusted memory rank refresh rates is based on one of the memory rank comparisons.

13. The memory controller of claim 10 wherein adjusting the overall memory usage delay comprises increasing the overall memory usage delay in response to the overall error count being greater than one or more of the overall thresholds.

14. The memory controller of claim 10 wherein adjusting one or more memory rank usage delays comprises increasing a first memory rank usage delay in response to a first memory rank error count being greater than a first memory rank error threshold.

* * * * *